US005458713A

United States Patent [19]

Ojster

[11] Patent Number: 5,458,713

[45] Date of Patent: Oct. 17, 1995

[54] MULTILAYER DATA CARRIER AND A METHOD FOR PRODUCING IT

[75] Inventor: Albert Ojster, Munich, Germany

[73] Assignee: GAO Gesellschaft fuer Automation und Organisation mbH, Munich, Germany

[21] Appl. No.: 109,786

[22] Filed: Aug. 20, 1993

Related U.S. Application Data

[62] Division of Ser. No. 765,652, Sep. 25, 1991, Pat. No. 5,251,937.

[51] Int. Cl.[6] .............................. B44C 1/00; B32B 31/04

[52] U.S. Cl. .......................... 156/234; 156/240; 156/277

[58] Field of Search ..................................... 428/915, 916; 283/91, 904; 156/234, 230, 239, 240, 344, 277, 219, 220, 233

[56] References Cited

U.S. PATENT DOCUMENTS

| | | | |
|---|---|---|---|
| 4,057,919 | 11/1977 | Gauch | 428/916 X |
| 4,094,575 | 6/1978 | Kellie . | |
| 4,101,698 | 7/1978 | Dunning | 156/230 X |
| 4,250,217 | 2/1981 | Greenway | 428/161 X |
| 4,304,809 | 12/1981 | Moran | 428/916 X |
| 4,417,784 | 11/1983 | Knop | 283/91 X |
| 4,428,997 | 1/1984 | Shulman | 428/916 X |
| 4,560,426 | 12/1985 | Moran | 156/234 X |
| 4,630,891 | 12/1986 | Li | 428/916 X |
| 4,684,795 | 8/1987 | Colgate | 283/904 X |
| 4,705,300 | 11/1987 | Berning | 283/91 X |
| 4,728,377 | 3/1988 | Gallagher | 156/58 X |
| 4,837,081 | 6/1989 | Smits | 428/915 X |
| 4,856,857 | 8/1989 | Takeuchi . | |
| 4,869,946 | 9/1989 | Clay | 428/915 X |
| 4,908,285 | 5/1990 | Kushibiki | 156/234 X |
| 4,994,314 | 2/1991 | Rosenfield | 428/915 X |
| 5,002,312 | 3/1991 | Philips | 283/904 X |
| 5,060,981 | 10/1991 | Fossum | 283/109 X |
| 5,138,604 | 8/1992 | Umeda | 369/103 X |
| 5,142,383 | 8/1992 | Mallik | 359/2 C |
| 5,145,212 | 9/1992 | Mallik | 283/86 X |
| 5,169,707 | 12/1992 | Faykish | 428/195 |
| 5,248,544 | 9/1993 | Kaule | 428/915 X |
| 5,294,470 | 3/1994 | Ewan | 428/915 X |
| 5,310,222 | 5/1994 | Chatwin et al. | 283/86 X |
| 5,319,475 | 6/1994 | Kay et al. | 359/2 X |

FOREIGN PATENT DOCUMENTS

| | | | |
|---|---|---|---|
| 3422908 | 1/1986 | Germany | 428/915 |
| 8707034 | 11/1987 | WIPO | 283/91 |

*Primary Examiner*—David A. Simmons
*Attorney, Agent, or Firm*—Townsend and Townsend and Crew

[57] ABSTRACT

The present invention relates to a data carrier, in particular an identity card, paper of value or the like, having applied thereto a plane element (OVD) with optically variable effects which are dependent on the viewing angle. Within at least a predefined area of the OVD there is additional information provided between the OVD and the surface of the data carrier in the form of characters, patterns or the like which, subsequently incorporated into the OVD, overlays the optically variable effect of the OVD and is likewise visually recognizable. The invention also relates to a method for producing such a data carrier.

3 Claims, 2 Drawing Sheets

MULTILAYER DATA CARRIER AND A METHOD FOR PRODUCING IT

This is a Division of application Ser. No. 07/765,652 filed Sep. 25, 1991, now U.S. Pat. No. 5,251,937.

BACKGROUND OF THE INVENTION

The present invention relates to a data carrier, in particular an identity card, paper of value or the like, having a plane element (OVD) with optically variable effects which are dependent on the viewing angle, and to a method for producing such a data carrier.

To protect data carriers it is known to use optically variable devices (OVDs) whose visual effect is based on diffraction, interference or the like. In this connection one particularly uses holograms, cinegrams, diffraction grids and interference layer elements for protecting credit cards, identity cards, bank notes, security documents and the like. Such devices meet the traditional security requirements for humanly testable authenticity features, i.e. high manufacturing effort, on the one hand, and clear testability without any additional aid, on the other hand. OVDs furthermore correspond to the newest state of the art so that they give the associated product a modern high-technology character.

Due to the high manufacturing effort, embossed holograms, for example, are relatively expensive, which has up to now restricted their use as carriers of individual information. An economically reasonable production of holograms has been possible up to now only in high piece numbers. To increase protection against forgery and to obtain further individualization of series of cards or single cards, however, there is a need to make holograms having the same appearance distinguishable from each other by additional measures or to permit a certain degree of individualization in the area of the hologram despite the use of like holograms. These additional measures would make different cards visually distinguishable in the hologram area as well although the holograms themselves show no direct difference.

In the ideal case these measures should also be suitable for including the individual data which are associated, for example, only with the justified user of an identity card. The problem is thus to individualize standard holograms produced in large series no later than upon application of the holograms to a data carrier in such a way that they are specific only to this one data carrier or at least only to a limited number of data carriers.

The invention is therefore based on the problem of proposing a data carrier having an optically variable device, in particular a hologram, wherein the optically variable device is individualized by additional measures.

SUMMARY OF THE INVENTION

This problem is solved by providing in the area of the OVD additional information in the form of characters, patterns or the like which, subsequently incorporated into the OVD, overlays the optically variable effect and is likewise visually recognizable.

The invention is based on the finding that additional information is storable in almost all plane elements having optically variable effects dependent on the viewing angle, provided plane elements are used in which the optically variable effect is present over a large area and the optically variable effects can be locally changed, dampened or even destroyed by structural changes, disturbances or inhomogeneities in the layer structure. If these disturbances are provided in the form of patterns, characters or pictorial symbols they are integrated in the OVD disposed on a data carrier as patterns, characters or pictorial symbols and are likewise recognizable in addition to the optically variable effects recognizable at special viewing angles. In this way one can produce individualizations of OVDs which can be checked together with the OVD since they are integrated therein, on the one hand, and which are also protected thereby from changes and manipulation, on the other hand.

The inventive additional information is preferably produced using a technology departing from the production of OVDs by selectively incorporating disturbances in the layers producing the optically variable effect, which can be done in the simplest case by providing locally limited surface roughness in areas with otherwise relatively small surface roughness, and impressing this roughness into the OVD upon application to the data carrier.

The term "surface roughness" refers in the inventive sense to the data carrier in the state in which the OVD is being fixed to the data carrier.

For application by so-called cold-bonding methods the surface must accordingly have the necessary roughness at room temperature to locally "disturb" the optically variable layers. For elements to be applied by hot-laminating or hot-stamping methods the roughness must still be sufficiently present at this temperature or at least appear in time at this temperature in order to obtain the desired effects. The last-mentioned aspect is of special interest when using printing inks which are provided with pigments or the like together with thermoplastic binders, since these inks form a basically smooth surface in the dried state through which the pigments can be noticed on the surface as "roughness" in a sufficiently heated state under the action of pressure (laminating or hot-stamping pressure). This is presumably because if there is a sufficiently high proportion of pigment the binder is pressed to the side and the harder pigments "remain stacked" so to speak. Since the inventive effect does not occur with an insufficient proportion of pigment, excessively thick ink layers or in connection with binders which do not become sufficiently liquid at the laminating temperatures, the "roughness" can be adjusted by these parameters, among other things.

To produce the inventive effects surface structures are thus suitable, regardless of the method for applying the plane element, which are produced in data carriers by engraving, sand-blasting, embossing, etching or the like. When using data carriers to which the optically variable devices are applied by the hot-laminating or hot-stamping method, however, a roughness present only in the hot state is already sufficient, i.e. one can also use pigments embedded in thermoplastic binders.

Combinations of the two stated possibilities are of course also conceivable, e.g. the partial engraving of a homogeneous pigmented outer data carrier layer or the local elimination of surface roughness by covering it with non-pigmented smooth layers or the partial ironing-out of rough structures provided over the surface.

The layer elements to be used are basically all elements which have different optical properties at different viewing angles, on the one hand, and are so thin that the surface roughness changes these optical effects in visually recognizable fashion by surface deformations (preferably in the microscopic range), on the other hand. These requirements are met substantially by all thin glossy layers to be applied by the transfer technique and by appropriately applied diffraction grids, holograms, cinegrams, interference layer elements and the like.

The basic inventive principle shall be explained in the following with reference to various plane elements which are fabricated on so-called transfer bands as semifinished products and transferred to the actual data carrier by the transfer method.

BRIEF DESCRIPTION OF THE DRAWINGS

The subsequent embodiments of the invention shall be described by way of example with reference to the drawing, in which.

DESCRIPTION OF THE PREFERRED EMBODIMENT

Figure 1:
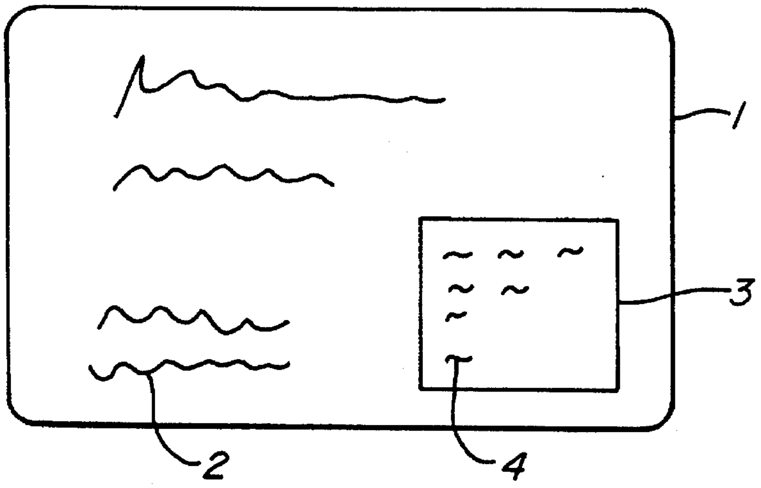
FIG. 1. PRIOR ART
FIG. 1 shows a known data carrier with an applied OVD.

FIG. 1 shows a conventional data carrier 1, e.g. an identity card, having a general printed pattern 2 and an optically variable device 3 which is designed in the present case as an embossed hologram and in which the holographic information is symbolized by wavy lines 4.

Such data carriers 1 are customarily constructed from a plurality of film layers whereby the inner layers are opaque and provided on the front and back with printed patterns 2. To avoid damage, manipulation and falsification of printed pattern 2 the printed inner layers are customarily covered with transparent film layers. The optically variable devices, in the present case hologram 3, are generally applied to the outer surface of these transparent cover films. This is done either by gluing (cold-laminating method) or by the so-called hot-stamping or hot-laminating method by lamination under the action of heat and pressure (hot lamination). Regardless of the application method one always endeavors to dispose the preferably very thin hologram on the card surface without forming ridges.

It is well-known that common transfer holograms have a metalized reflective layer that looks like a high-gloss mirror at special viewing angles but clearly reveals the holographic information at other viewing angles. Such holograms are integrated into the design of the data carriers, i.e. coordinated with printed pattern 2 so that they form an optical unit together.

Figure 2:
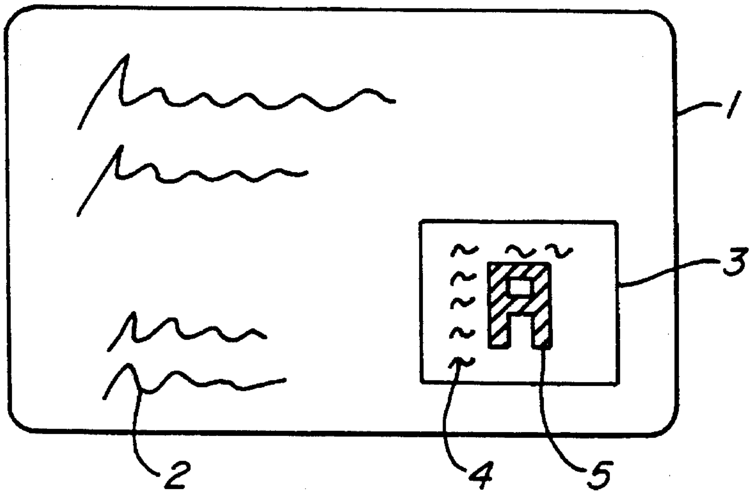
FIG. 2 shows a data carrier with an OVD in which inventive additional information is provided.

FIG. 2 shows known identity card 1 whereby inventive additional information 5, in the present case in the form of the letter "A", is provided in the area of embossed hologram 3. Additional information 5 is integrated into the high-gloss metal layer of hologram 3 as a matte structure. When regarded at different angles of reflection the holographic information is recognizable as usual, on the one hand, but additional information 5, which is recognizable at almost all viewing angles and is quasi overlaid by the holographic information, is also distinct from the general holographic information due to its flat matte appearance, on the other hand. Additional information 5 can be recognized particularly clearly at the angles of reflection at which the holographic effects are not recognizable but the metal layer appears only as a mirror. At the angles at which the holographic information appears particularly clearly additional information 5 is less visible since it is outshined by the holographic information so to speak.

Figure 3:
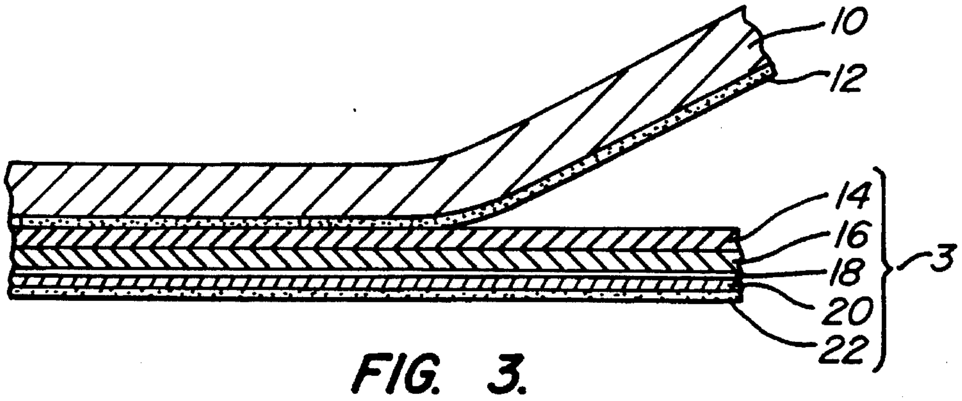
FIG. 3 shows the cross section through a transfer band.

The structure of an inventively usable transfer hologram is shown schematically in FIG. 3 without consideration of the actual proportions. The transfer band comprises a carrier material 10, for example a polyester film, and a separation layer 12 disposed thereon that melts at the laminating temperature and permits detachment of carrier layer 10. Adjacent to separation layer 12 is a layer of protective lacquer 14 that becomes the outer layer after transfer of the hologram to a data carrier and offers the hologram a certain degree of mechanical protection. Under layer of protective lacquer 14 there is a thermoplastic layer 16 in which the diffraction structures of the hologram are impressed by a press die. A metal layer 18 is sputtered on the hologram structure. Depending on the production method the impressing and metalizing can also take place in reverse order. Finally, a protective lacquer 20 and thereupon a heat-sealing layer 22 are customarily provided on the impressed side of the laminar compound. Metal layer 18 can also be sputtered on so thinly that it is partly permeable; it is also conceivable to apply the metal layer using a screen or to use other variants.

Embossed hologram 3 comprising layers 14, 16, 18, 20 and 22 is transferred to data carrier 1 with the aid of carrier band 10.

The embossed hologram is transferred to the data carrier by the hot-stamping method with the aid of a so-called hot-stamping die. The transfer band is placed with heat-sealing layer 22 on data carrier 1. The hot-stamping die is pressed on for a certain time at a predefined pressure whereby separation layer 12 melts under the press die and activates heat-sealing layer 22. After removal of the hot-stamping die, carrier band 10 is removed. Precisely those parts of the hologram which were pressed on by the hot-stamping die remain stuck to the data carrier 1. The remaining parts of the hologram which were not disposed directly below the hot-stamping die remain on the carrier band and are removed therewith from data carrier 1 The transfer band is known as such and not the object of the present invention.

Transfer by the hot-laminating method takes place in a similar form except that the data carrier is completely covered with laminating plates and heat and pressure act on the entire area of the data carrier. The element to be transferred, if it is to be limited to partial areas of the data carrier, must thus already be present on the transfer band in the dimensions in which it is later to be present on the data carrier.

Figure 4:
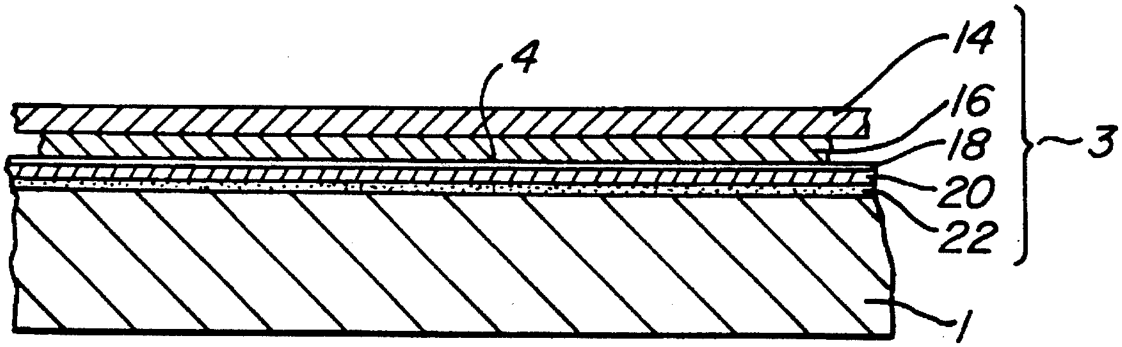
FIG. 4 shows the cross section through the known data carrier according to FIG. 1.

FIG. 4 shows in cross section the area of the hologram of data carrier 1 shown in FIG. 1. For simplicity's sake, card body 1 which generally comprises three or more layers is shown with one layer. The proportions of the layers are likewise untrue for clarity's sake. Card 1, designed as a standard card, normally has a thickness of about 0.76 mm. The thickness of the transfer hologram is customarily in the range of a few micrometers.

The layer structure in FIG. 4 includes data carrier 1 to which the hologram comprising layers 20, 18, 16 and 14 is affixed by means of adhesive layer 22. Holographic information 4 is impressed in thermoplastic layer 16 and thin metal layer 18 in the known way as a microrelief. Layers 14 and 20 are designed as resistant layers of lacquer to protect the hologram from mechanical damage.

Layer structure 14, 16, 18, 20 and 22 is dimensioned and structured in such a way that it forms a mechanically stable unit when fixed to the card body, on the one hand, but has such low inherent stability that detachment from the card leads to destruction of the hologram, on the other hand. A more detailed description of such transfer holograms can be found for example in German "offenlegungsschrift" no. 33 08 831.

Figure 5:
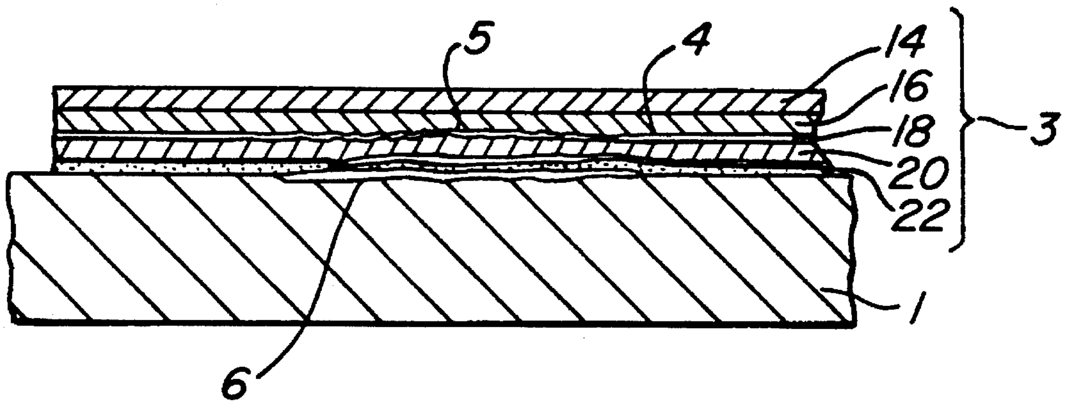
FIG. 5 shows the cross section through the data carrier according to FIG. 2.

In FIG. 5 the same layer structure is selected as in FIG. 4 except that additional information 5 is integrated into the layer structure here in the form of structural inhomogeneity.

As explained below, additional information 5 can be produced in a great variety of forms. In the present case (FIG. 5) it is produced by additional printed information 6 which is disposed under the hologram and pressed into layers 20 and 18 bearing the hologram through the layer structure upon application of the OVD. Printed layer 6 consists of pigmented inks and preferably has a thickness of about 5 to 20 μm. The ratio of binder to pigment is selected such that good "filling" exists in the dry ink layer, i.e. the pigments are present continuously when regarded across the layer thickness. This is generally the case with highly opaque pigment inks.

Since the inks are of very different structures depending on the components used, it is impossible to state a preferred mixture ratio. Experiments have shown, however, that the desired effect can already be obtained with a large number of highly opaque and pigmented inks without any additional measures. The intensity of the effect must be ascertained experimentally for each ink separately. A following change in intensity can be effected by varying the layer thickness or changing the proportion of pigment or binder.

Particularly good results have been achieved with screen printing inks from the Wiederhold company with the company names J 65, J 60, J 12 and J 20. Pigments that have proved particularly useful are carbon black, chrome yellow and titanium dioxide, but this is not intended to restrict the invention to these pigments.

Hologram 3 shown in cross section in FIG. 5 and disposed above printed layer 6 is pressed onto the card surface by a hot-laminating method under the action of pressure and heat. During pressing, softening adhesive layer 22 is activated, thereby obtaining an intimate bond with the card surface, on the one hand, and impressing the screen printed layer into the layer structure of the transfer hologram, on the other hand.

The inventive effect is presumably produced because the thermoplastic binder of the pigmented ink softens in the same way as the adhesive layer and flows off to the side giving way to the pressure while the pigments "remain stacked" thus forming a more or less rough surface structure depending on the grain size. This structure is impressed in hologram layer 18, producing disturbances, which are visually recognizable in the otherwise smooth metal surface, in the relief structure of the hologram which is in the micrometer range. The disturbances produced in this way dampen the holographic recording, on the one hand, and produce in the high-gloss metal layer matte plane structures that contrast well with the surroundings and are thus well recognizable visually, on the other hand.

Depending on the intensity of the pigment structure the disturbance of the holographic effect is adjustable within wide limits, i.e. it is possible both to eliminate the holographic effect fully in these areas and to make it so weak that the additional information is recognizable only upon closer viewing at the grazing angle of the metal layer.

As already mentioned, various measures are conceivable for producing the inventive effects. In the simplest case the information and data selected for individualization are applied with pigment-containing ink in the areas of the card in which they are to appear in the subsequently applied hologram. When a holographic plane element is applied over this printed pattern by the hot-laminating or hot-stamping transfer method the printed surface areas are recognizable in the later hologram as matte surfaces in the otherwise high-gloss metallic layer of the hologram. The hologram effects are dampened to varying degrees by these measures depending on the intensity but generally not fully destroyed, so that one can detect an overlaying of the two types of information at certain viewing angles.

According to further embodiments of the invention the printed additional information can also be printed by means of the pigment-containing ink onto adhesive layer 22 of the transfer hologram and transferred to data carrier 1 together therewith.

It is also possible to print a pigment-containing layer onto the data carrier over a large area and then either remove the areas which are still to appear glossy in the later hologram by engraving, or cover them with transparent lacquer or the like.

It is likewise within the scope of the invention to employ, instead of the pigment-containing printed layer over a large area, suitably filled cover films which are either likewise covered partially with transparent lacquer or the like or for which transfer holograms are used in which the adhesive layer is varied in thickness in accordance with the additional information.

From the great number of possible variations some specific examples shall be described in the following to illustrate the invention further.

EXAMPLE 1

A print (alphanumeric characters, patterns, etc.) was applied by the screen printing technique in the area of the OVD to a multilayer card having transparent cover films on the outside. The screen printing was performed with a 70 screen (70 mesh per centimeter) using Wiederhold screen printing ink J 65 (with carbon black pigment). The screen printing ink originally present in a pasty form was mixed with 10% thinner (Wiederhold JVS).

A commercial transfer hologram was laminated onto the hardened print, which had a dry layer thickness of about 20 μm.

After detachment of the transfer foil the hologram was recognizable with high brilliance in the unprinted areas. In the area of the screen-printed characters these areas were present as sharply outlined matte structures that were well recognizable at all viewing angles. The holographic effect was still visible in the area of the additional information but only with a highly dampened quality.

EXAMPLE 2

A card as in Example 1 was used, i.e. a multilayer structure with transparent cover films on the outside. In the area of the OVD characters were provided on the card surface in the form of a grained surface relief. This surface relief was produced by local sand-blasting of the basically high-gloss laminating plates.

A commercial transfer hologram was applied over the relief structures by the hot-stamping transfer method.

After removal of the transfer band the characters were likewise recognizable as sharply outlined matte structures that were clearly distinct from the glossy structure of the hologram at the particular viewing angles. However, in this embodiment the matte structures were substantially weaker and primarily visible only at the grazing angle of the metal layer. The holographic effect was in this case also so strong in the areas of the additional information that the latter almost completely disappeared at the optimal viewing angle for the hologram.

EXAMPLE 3

A card as in Example 1 was printed in the OVD area over the entire area with screen printing ink (Wiederhold J 65, screen with 70 mesh per centimeter). After the ink hardened a pattern was engraved in the screen-printed surface or the screen printing ink was removed in a pattern.

After a transfer hologram was laminated on, the engraved areas were recognizable as glossy structures with a clearly recognizable holographic effect in matte surroundings with a dampened holographic effect. The dampening of the holographic effect corresponded approximately to that in Example 1.

EXAMPLE 4

A card was prepared as in Example 3 with a large-area screen-printed field and covered partially with transparent lacquer (Wiederhold J 70, layer thickness about 20 μm) after the ink hardened. A commercial transfer hologram was applied over this assembly by the hot-stamping transfer method.

After removal of the transfer foil the areas covered with transparent lacquer were recognizable with high-gloss and an undampened holographic effect in the hologram area. In the uncovered areas the additional information was visible in the form of matte structures with a highly dampened holographic effect, as described in Example 1.

EXAMPLE 5

A transfer hologram wherein the adhesive layer was varied in thickness in a pattern was laminated onto a card with screen printing over a large area (in accordance with Example 3). The thin adhesive layer areas corresponded to the thickness customary in transfer holograms. The thick adhesive layer areas were strengthened by about 15 μm by additional printed adhesive.

After the hologram was applied by the hot-laminating method the additional information was recognizable (in the areas of the thin adhesive layer) as matte structures as in Example 1. In the areas of the thick adhesive layer the hologram was present in an undampened glossy form.

EXAMPLE 6

A commercial transfer hologram was applied to a card with outer transparent films (according to Example 1) by the hot-stamping method. Before application of the hologram a screen-printed pattern was applied to the adhesive layer with pigmented ink (Wiederhold J 65; 70 screen).

After removal of the transfer foil the screen-printed pattern was recognizable as a matte structure in the high-gloss metal layer of the hologram, just as in the preceding examples.

EXAMPLE 7

A negative print formed with transparent lacquer (transparent lacquer J 70 from Wiederhold, layer thickness about 10 μm) was provided in the area of the OVD on a card whose outer layer was designed as an opaque, white PVC film with titanium dioxide as a filler. A high-gloss thin metal layer was applied over the layer of transparent lacquer by the hot-stamping transfer method.

After detachment of the transfer foil the surface areas not covered with transparent lacquer were recognizable as matte structures in the high-gloss metal layer to varying degrees depending on the viewing angle.

EXAMPLE 8

A transfer hologram was applied to a card with transparent cover films (in accordance with Example 1) by the hot-stamping method. A sand-blasted relief was impressed into the transfer hologram in a pattern from the back against a high-polished steel plate before application to the card. The additional structures produced in this way were already recognizable as matte patterned structures in the transfer hologram before transfer to the card.

After application of the transfer hologram to the card surface by the hot-stamping method the matte structures were present in an almost unchanged form and were clearly recognizable at various viewing angles as in the preceding examples.

EXAMPLE 9

A transfer interference element was applied to a card as described in Example 1 by the hot-stamping transfer method. Such interference elements are known and described for example in U.S. Pat. No. 3,858,977.

Before application of the transfer element a patterned rough structure was impressed into the latter from the back (adhesive layer) against a smooth steel surface. The transfer element normally has a gold-orange color effect that changes to an iridescent green color effect at a different viewing angle. The areas with the additional information were now recognizable almost constantly at all viewing angles as a matte structure showing a slightly iridescent yellow color.

After application of the thus prepared interference element the additional information produced by the impressed structure was present in an almost identical form.

EXAMPLE 10

A transfer interference element was applied to a card as described in Example 1 (screen printing on a transparent cover film). After removal of the transfer foil the same color change effects were recognizable in the screen-printed areas as in the embodiment example described in Example 9.

The invention provides a very simple and cheap possibility of equipping OVDs with additional information. With respect to its optically variable effect the additional information can be incorporated with selective control of its intensity in such a way as to lack dominance or have only a secondary effect or to be well recognizable at all viewing angles. The additional information is always recognizable with the optically variable effect and integrated harmoniously into the general impression of the optically variable effect.

The production of the inventive effects can be readily integrated into the known technologies of card production.

Optically variable devices, in particular holograms, are customarily applied in one of the last manufacturing steps on the card when it is laminated and already punched out. The structures required for the inventive additional information can be produced in one or more intermediate operations. Depending on the materials used and the effects desired, the required measures are performed on the particular half-finished cards and/or on the finished cards.

I claim:

1. A method of producing a data carrier having an optically variable element comprising the steps of:

providing a substrate with a first surface;

changing the first surface of the substrate in a locally limited area to provide a structural inhomogeneity in the locally limited area, the structural inhomogeneity being produced by printing the substrate with a cover film filled with pigments to form a printed layer and then locally covering the printed layer with non-pigmented layers;

applying the optically variable element onto the first surface of the substrate such that at least a part of the locally limited area lies beneath the optically variable plane element; and impressing at least a part of the locally limited area into the optically variable element so to impress the structural inhomogeneity into the optically variable element.

2. The method of claim 1 wherein the non-pigmented layers are applied in a thickness of about 5–20 um.

3. The method of claim 1 further including adjusting an intensity of the structural inhomogeneity by adjusting a thickness of the non-pigmented layers.

* * * * *